United States Patent [19]
Fischer et al.

[11] 4,096,672
[45] Jun. 27, 1978

[54] ANCHORING ARRANGEMENT FOR SECURING AN OBJECT TO A SUPPORT STRUCTURE HAVING AN INTERNAL CAVITY

[75] Inventors: Artur Fischer; Klaus Fischer, both of Tumlingen, Waldachtal, Germany

[73] Assignee: Artur Fisher, Tumlingen, Waldachtal, Germany

[21] Appl. No.: 732,447

[22] Filed: Oct. 14, 1976

Related U.S. Application Data

[63] Continuation-in-part of Ser. No. 631,153, Nov. 11, 1975, Pat. No. 4,044,512.

[30] Foreign Application Priority Data

| Oct. 25, 1975 | Germany | 2547823 |
| Nov. 3, 1975 | Germany | 2548979 |
| Nov. 13, 1975 | Germany | 2550954 |
| Mar. 27, 1976 | Germany | 2613178 |
| Nov. 14, 1974 | Germany | 2453957 |
| May 26, 1975 | Germany | 2523198 |
| Jun. 6, 1975 | Germany | 2525220 |
| Jun. 17, 1975 | Germany | 2525452 |
| Jun. 14, 1975 | Germany | 2526744 |
| Jun. 21, 1975 | Germany | 2527773 |

[51] Int. Cl.² .......................... E04B 1/41; E04C 5/12
[52] U.S. Cl. .......................................... 52/127; 52/704
[58] Field of Search .............................. 52/704, 127

[56] References Cited

U.S. PATENT DOCUMENTS

| 1,564,947 | 12/1925 | Copeman | 52/704 |
| 2,092,341 | 9/1937 | DeVries | 52/704 |
| 2,930,199 | 3/1960 | Jarund | 52/704 X |
| 3,108,404 | 10/1963 | Lamb | 52/704 X |
| 3,308,585 | 3/1967 | Fischer | 52/704 X |
| 3,379,019 | 4/1968 | Williams | 52/704 X |
| 3,532,316 | 10/1970 | Mathes | 52/744 X |
| 3,566,947 | 3/1971 | Jukes | 85/83 |
| 4,001,989 | 1/1977 | Fischer | 52/704 X |

Primary Examiner—Alfred C. Perham
Attorney, Agent, or Firm—Michael J. Striker

[57] ABSTRACT

An anchoring arrangement for securing an object to a support structure having an internal cavity includes an anchoring element which extends through an anchoring hole into the internal cavity and includes a hollow anchoring member having a passage at its leading end and a collar mounted on the trailing end of the anchoring member so as to surround the same, which supports the anchoring element in the anchoring hole and closes the anchoring hole around the anchoring member. A bag-shaped limiting member surrounds at least a portion of the anchoring element and defines a compartment therewith, and hardenable material is introduced into the compartment through the interior of the anchoring member and through the passage to fill the compartment and to harden therein in form of a body of hardened material which attaches the anchoring element to the support structure and prevents an extraction thereof from the anchoring hole. The limiting member may be air-permeable but impermeable to the hardenable material to allow for venting of air present in the compartment, and may be of an elastically, preferably non-isotropically, yieldable material. A shielding element is used for guiding the hardenable material toward the passage and for protecting the interior of the anchoring member from contact with the hardenable material. A valve arrangement may be provided which prevents backflow of the hardenable material from the compartment into the interior of the anchoring member upon the termination of the introduction of the hardenable material into the compartment.

17 Claims, 4 Drawing Figures

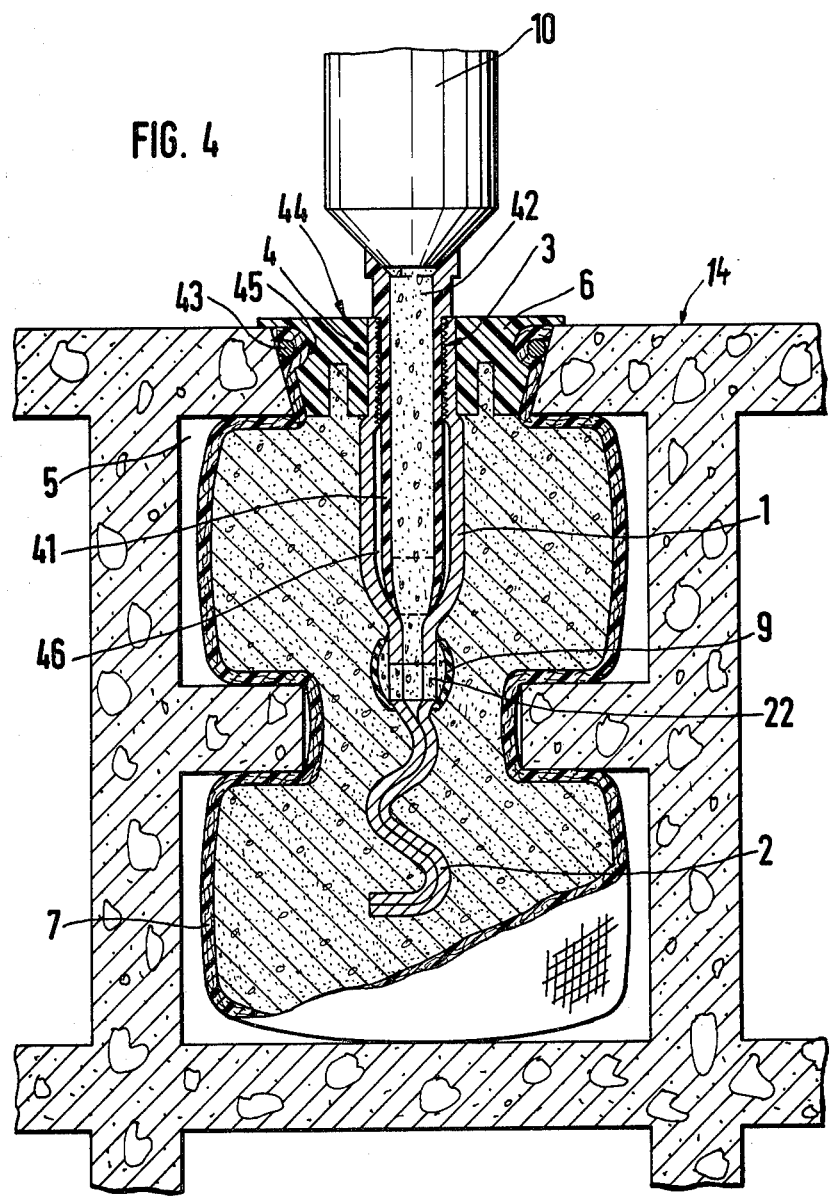

ANCHORING ARRANGEMENT FOR SECURING AN OBJECT TO A SUPPORT STRUCTURE HAVING AN INTERNAL CAVITY

CROSS-REFERENCE TO RELATED APPLICATIONS

This application is a continuation-in-part application of our copending application Ser. No. 631,153, filed on Nov. 11, 1975 now U.S. Pat. No. 4,044,512.

BACKGROUND OF THE INVENTION

The present invention relates to an arrangement for securing an object to a support structure in general, and more particularly to such an arrangement which is to be used in connection with support structures which have internal cavities.

There are already known, for instance, from our patent application Ser. No. 631,153, various arrangements of the type here under consideration which can be used to advantage in support structures of relatively low strength and even in porous support structures or in support structures which have air inclusions or internal cavities or the like therein. In such conventional arrangements, the anchoring or securing effect is achieved by accommodating an anchoring member, such as a dowel, in an anchoring hole in the support structure, which anchoring hole may communicate with the above-mentioned air inclusions, internal cavities or pores. A collar-shaped support member is arranged at the trailing end of the anchoring member and supports the same in the anchoring hole at an open end thereof, and closes such open end of the anchoring hole. A body of hardenable material is then introduced into the anchoring hole and, as the case may be, also into the air inclusions, internal cavities or pores, to harden about the anchoring member and to thus secure the same in the anchoring hole and prevent its extraction therefrom. The hardenable material may be introduced into the anchoring hole through the interior of the anchoring member and through a passage or a plurality of passages provided at the leading end portion of the anchoring member, in which event there is provided a shielding element which guides the hardenable material toward the passage or passages and protects the internal surface of the anchoring member which bounds the interior of the latter from contact with the hardenable material. This is a particularly important expedient in view of the fact that a screw or a similar holding element is to be partly accommodated in the interior of the anchoring member, such as by threading the same into an internal thread provided at the trailing end of the anchoring member in the interior thereof, after the anchoring element has been attached to the support structure.

These prior-art arrangements are advantageous in many respects, and particularly high anchoring or securing values are achieved thereby, even when used in support structures which are of low-strength materials. As already mentioned before, these conventional arrangements can also be used in support structures which have internal cavities with which the anchoring hole communicates. However, experience with these arrangements has shown that the consumption of the hardenable material may be excessive when the internal cavities have substantial dimensions, such as the internal cavities in building blocks or the like. More particularly, it has been established that the full anchoring or securing effect cannot be achieved until the entire internal cavity has been filled with the hardenable material.

SUMMARY OF THE INVENTION

Accordingly, it is an object of the present invention to avoid the disadvantages of the prior art.

More particularly, it is an object of the present invention to provide an anchoring arrangement which can be used in support structures having substantial internal cavities.

It is a further object of the present invention to provide an anchoring arrangement of the type here under consideration in which the demand for the hardenable material is reduced as compared to that in the conventional anchoring arrangements.

In persuance of these objects and others which will become apparent hereafter, one feature of the present invention resides, in an arrangement for securing an object to a support structure having an anchoring hole which communicates with a cavity within the support structure, briefly stated, in an elongated anchoring element which has one part of transverse dimensions smaller than, and another part of transverse dimensions substantially corresponding to those of the anchoring hole so that the anchoring element is insertable into the anchoring hole through an open end thereof until a leading end portion of said one part extends into the cavity and said other part supports the anchoring element at the open end of the anchoring hole and closes the latter, the anchoring element having an interior bounded by an internal surface and extending between the leading end portion and a trailing end portion of the anchoring element; and means for forming a plug about at least the leading end portion of the anchoring element to thereby attach the latter to the support structure and to prevent the extraction thereof from the anchoring hole, the means for forming the plug including a bag-shaped limiting member which is mounted on the inserted anchoring element in such a manner as to surround at least the leading end portion of the anchoring element and define a compartment therewith, and means for introducing hardenable material into the compartment for hardening therein about the anchoring element, including at least one passage through the leading end portion of the anchoring element for communicating the interior of the anchoring element with the compartment, and shielding means situated in the interior of the anchoring element at least during the introduction of the hardenable material into the compartment and operative for guiding the hardenable material through the interior toward the passage and for preventing the hardenable material from contacting the internal surface of the anchoring element at the trailing end portion thereof. Preferably, the anchoring element includes a tubular anchoring member which constitutes the above-mentioned one part, and a mounting collar which constitutes the other part and is mounted on the trailing end portion of the anchoring member so as to surround the same. The anchoring element may have an internal thread in the interior at the trailing end portion thereof for threading of a threaded attaching member thereinto. In a currently preferred embodiment of the present invention, the limiting member is of an elastically yieldable material.

When the arrangement for securing an object to a support structure of the present invention is to be anchored in the support structure, an anchoring hole having dimensions substantially corresponding to the transverse dimensions of the collar is formed in the support structure, and then the anchoring element is introduced into the anchoring hole and into the internal cavity of the support structure with which the anchoring hole communicates. When this is done, the collar which is mounted on the anchoring member will support the latter in the anchoring hole with a clearance therefrom, and will hold the anchoring member in such position, while simultaneously closing the open end of the anchoring hole and the above-mentioned clearance.

After the anchoring element has been so supported in the support structure, a body of hardened material is to be formed rearwardly of the collar in the internal cavity of the support structure and/or in the anchoring hole. To achieve this, a hardenable material is introduced into the compartment defined by the bag-shaped limiting member and the anchoring element through the interior of the latter and through the aforementioned passage or passages provided at the leading end of the anchoring member. When the hardenable material is introduced into the compartment, the bag-shaped limiting member is expanded within its range of elasticity to assume a balloon-shaped configuration. As a result of the provision of the bag-shaped limiting member, the internal cavity of the support structure need not be filled with the hardenable material in its entirety; it is rather sufficient to only fill the compartment delimited by the bag-shaped limiting member within the internal cavity of the support structure.

When the hardenable material hardens in the compartment about the anchoring element or a portion thereof, the latter will be embedded in a hardened body of such material, such hardened body constituting an anchoring support for the anchoring element in the internal cavity of the support structure, so that the body, which has dimensions exceeding those of the anchoring hole, prevents extraction of the anchoring element out of the anchoring hole and out of the inner cavity when an object is connected to the anchoring member. Therefore, this arrangement renders it possible to obtain excellent retention values even in support structures which have large-size internal cavities, without requiring excessive amounts of hardenable material. This is attributable to the fact that the aforementioned bag-shaped limiting member confines the body of hardenable material so that it is no longer necessary to fill the entire internal cavity with the hardenable material; rather, only so much of the internal cavity will be filled with the hardenable material as is necessary for attaching the anchoring element to the support structure, the dimensions of the body of hardenable material being determined by the size, configuration, and elastic properties of the bag-shaped limiting member. It will be appreciated that the elimination of the need for filling the entire cavity with the hardenable material will considerably reduce the consumption of the latter, particularly where the size of the internal cavity is substantial, as it is, for instance, in building blocks or the like.

According to a further concept of the present invention, the bag-shaped limiting member is so constructed as to be permeable to gaseous media and impermeable to the hardenable material to permit venting of air from the compartment into the cavity and prevent escape of the hardenable material. This can be achieved by providing a plurality of venting openings in the limiting member which have such flow-through cross-sections as to permit flow of air therethrough but to prevent the hardenable material from escaping therethrough. In addition to the venting of the air from the compartment, another advantage is obtained from making the limiting member gas permeable in that the hardening process is enhanced and expedited thereby.

When the bag-shaped limiting member is of an elastically yieldable material, particularly of a resilient material, so that it extends during the introduction of the hardenable material into the compartment, the limiting member is tensioned thereby so that, upon the termination of the introduction of the hardenable material into the compartment, the hardenable material will be at a superatmospheric pressure so that the hardenable material will have a tendency to flow back into the interior of the anchoring element after the introduction of the hardenable material into the compartment at elevated pressure has been terminated. In order to avoid this possibility of backflow, it is proposed, according to a further aspect of the present invention, to provide means for preventing the backflow of the hardenable material through said passage from the compartment into the interior of the anchoring element, including a resiliently yieldable valve member which extends across the above-mentioned passage and is deflected therefrom to permit the introduction of the hardenable material into the compartment only to resiliently return into the original position thereof for preventing the backflow of the hardenable material into the interior.

It will be appreciated that the above-mentioned valve member acts as a one-way valve which permits the flow of the hardenable material in one direction through the passage into the compartment, while preventing such flow in the opposite direction into the interior so that, upon the termination of the introduction of the hardenable material into the compartment, the hardenable material will be prevented from escaping through the passage and will maintain the bag-shaped limiting member in its tensioned condition. Consequently, the present invention permits the use of hardenable materials of very low viscosities which, accordingly, can be easily introduced into the compartment but which also require a substantial time period for hardening, without the fear that the hardenable material may escape from the compartment into the interior of the anchoring element.

In a currently preferred embodiment of the present invention, the valve member is sleeve-shaped and circumferentially surrounds a region of the leading end portion of the anchoring element in which the above-mentioned passage is provided. The sleeve-shaped valve member is resilient so that, when the hardenable material is introduced into the compartment, that is, when the pressure in the passage exceeds that in the compartment, the hardenable material lifts the valve member from the above-mentioned region to such an extent that the hardenable material will flow through the clearance between the lifted valve member and the above-mentioned region of the leading end portion of the anchoring element and will flow into the compartment. When the introduction of the hardenable material into the compartment is terminated, the pressure within the compartment will equal or exceed that in the passage so that the sleeve-shaped valve member will sealingly contact the above-mentioned region around the passage and thus prevent the flow of the hardenable substance from the compartment into the passage, thus preventing the backflow of the hardenable material into the interior of the anchoring element.

According to a further concept of the present invention, a retaining member is mounted on the leading end portion of the anchoring element in such a manner that a zone of the limiting member is sandwiched between the same and the leading end portion.

When this retaining member is used, the bag-shaped limiting member is supported on the anchoring element at two locations, rather than at a single location as is the case when such retaining member is not provided. As a result of this, the limiting member will develop a bulge between the two locations. Simultaneously therewith, the greatest part of the weight of the hardenable material filling the compartment delimited by the limiting member is carried directly by the anchoring element and the collar thereof, rather than by a limiting member proper and its abutment against the support structure so that, for the same elasticity of the limiting member, the body of the hardenable material will assume an almost axially symmetrical configuration even when the arrangement is used in vertically extending support structures. Inasmuch as only the area at which the limiting member contacts the support structure is determinative of the retention value of the body of hardenable material, the more symmetrical and bulgeshaped configuration of the body of hardenable material results in higher retention values even for smaller amounts of the hardenable substance accommodated in the compartment as compared to those amounts which need be introduced into the compartment when the retaining member is not provided.

In a further development of this concept of the present invention, the retaining member may be of a cup-shaped configuration and have a circumferential wall and a bottom wall, and at least one axially extending slit can be provided in the circumferential wall, the slit being open at one end thereof which is remote from, and closed at the other end which is close to the bottom wall.

This embodiment is particularly advantageous when the above-mentioned passage is constituted by an open end of the anchoring member which is of a tubular configuration in the region of its leading end. The hardenable material is then introduced into the compartment through such open leading end of the tubular anchoring element. Inasmuch as the limiting member is sandwiched between the retaining member and the leading end of the anchoring element, it will close the open end of the anchoring element when the pressure in the interior of the latter is the same as that in the compartment. However, once the pressure in the interior rises above that in the compartment, during the introduction of the hardenable material into the region of the open leading end of the anchoring element, the hardenable material will deflect the limiting member from the open end of the anchoring element and into the above-mentioned slit, thus providing a path for the hardenable material between the open end of the anchoring element and the compartment. On the other hand, when the introduction of the hardenable material into the compartment is terminated, that is, when the pressure in the compartment equals or exceeds that in the interior of the anchoring element, the elastic limiting member will assume its original position and thus eliminate the above-mentioned path and seal the interior of the anchoring element from the compartment. In this manner, backflow of the hardenable material from the compartment into the interior is avoided. The construction of the valve means for preventing the backflow of the hardenable substance in this manner is particularly simple and reliable and requires no additional elements.

In a currently preferred embodiment of the present invention, the elastically yieldable material of the limiting member is a non-isotropic fabric which is yieldable only in the radial direction of the limiting member.

The making of the limiting member of such non-isotropic material or fabric brings about a two-fold advantage. A first of these advantages resides in the fact that the material is a fabric which means that it is a material which is not only more wear-resistant and damage resistant than other materials, but is also permeable to gaseous media, thus assuring venting of air from the compartment into the remainder of the cavity surrounding the limiting member during the introduction of the hardenable material into the compartment, on the one hand and, on the other hand, also a more expeditious hardening of the hardenable material in the compartment because of the possibility of penetration of gases through the fabric of the limiting member.

A second advantage results from the fact that the non-isotropic fabric is stretchable only in the radial direction of the limiting member, and resides in the fact that the limiting member is more stable than under other circumstances so that the compartment defined thereby will be filled with the hardenable material in a more uniform and symmetrical manner and, as a result of this, the limiting member and the body of the hardenable material therein will assume a bulge-shaped configuration. Consequently, a large-area abutment will be achieved between the limiting member and the support structure, so that the body of the hardenable material, upon hardening, will be capable of withstanding high extraction forces resulting from attaching an object to the anchoring element embedded in the body of hardened material. On the other hand, the low or non-existent elasticity of the non-isotropic material of the limiting member in the other direction results in a substantial reduction of the amount of the hardenable material which is required for filling the compartment bounded by the limiting member about the anchoring element, without simultaneously reducing the anchoring effectiveness of the body of hardenable material.

The limiting member can be connected to the anchoring element in several different ways. So, for instance, a marginal portion of the limiting member may surround the collar of the anchoring element and may be clamped between the latter and the internal surface of the anchoring hole upon the introduction of the anchoring element into the anchoring hole and into the cavity.

On the other hand, it is proposed according to a further concept of the present invention to provide means for attaching the limiting member to the anchoring element, such attaching means including biasing means which urges the marginal zone of the limiting member against the anchoring element at a trailing end of the limiting member. The anchoring element may have an external annular groove which is adapted to receive the marginal zone of the limiting member. The marginal zone of the limiting member may be juxtaposed with the collar of the anchoring element. Then, the biasing means may include a ring-shaped spring element which surrounds the marginal zone and urges the same into the external annular groove of the anchoring element or a sleeve-shaped element which surrounds the marginal zone and presses the same against the external surface of the collar of the anchoring element.

When the limiting member is attached to the anchoring member at the collar as explained above, and especially at a trailing region of such collar, the anchoring arrangement of the present invention can be used to advantage even in support structures which have very thin walls separating the internal cavities from the exterior of the support structures. Under such circumstances, it is assured that the limiting member will expand immediately rearwardly of such relatively thin wall and form a bulge at such a region. A further advantage of this arrangement is to be seen in the fact that the limiting member is attached to the anchoring element in the region of the latter which is always received within the anchoring hole so that, in addition to the biasing force of the ring-shaped spring element or the like, the limiting member will also be attached to the anchoring element by forces resulting from the pressing of the collar of the anchoring element in the anchoring hole of of the support structure, regardless of the thickness of the wall which separates the internal cavity from the exterior of the support structure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a view similar to FIGS. 1 and 2 of a still further embodiment of the present invention.

DETAILED DISCUSSION OF THE PREFERRED EMBODIMENTS

Figure 1:
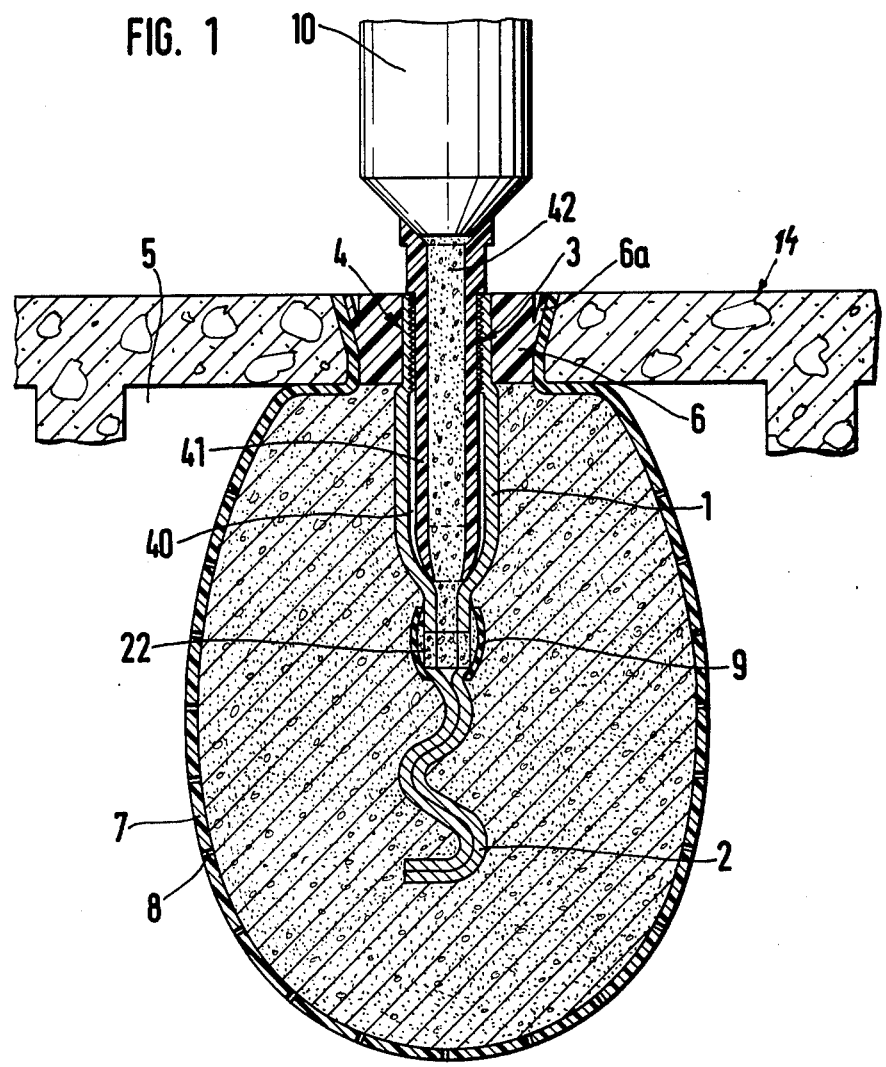
FIG. 1 is a sectional view of the anchoring arrangement of the present invention during the introduction of the hardenable material into the compartment.

Referring now to the drawing in detail, and first to FIG. 1 thereof, it may be seen that it illustrates an exemplary embodiment of the present invention which is representative of those embodiments which have been disclosed in more detail in our copending application Ser. No. 631,153. In this exemplary embodiment, the arrangement includes a generally tubular anchoring member 1 a leading end of which is squeezed flat and undulated in order to increase the retaining capability thereof, as indicated by the reference numeral 2. A trailing end 4 of the anchoring member 1 has an internally projecting portion which is provided with an internal thread 3 into which a screw or a similar threaded member is to be threaded upon the securing of the arrangement to a support structure 14.

The support structure 14 has an internal cavity 5 of relatively large dimensions. An anchoring hole extends between the cavity 5 and the exterior of the support structure 14, and a collar 6 constituting a part of the anchoring element is accommodated in the anchoring hole to support the anchoring member 1 therein and to seal the internal cavity 5 from the exterior of the support structure 14. Preferably, the collar 6 is received in the anchoring hole with a pressure fit. The collar 6 may have a sealing lip 6a which will seal the open end of the anchoring hole even when the latter is partially broken away at its open end.

The anchoring member or dowel 1 has an interior 40, and a passage 22 at a leading end portion thereof, which passage 22 communicates the interior 40 with the space surrounding the anchoring member 1. An injecting device 10 is used for introducing hardenable material into the interior 40 and toward the passage 22. A sleeve 41 is accommodated in the interior 40 and abuts against the internal surface of the anchoring member 1 upstream of the passage 22 to guide the hardenable material toward the passage 22 and to protect the internal surface bounding the interior 40 upstream of the region of sealing contact of the sleeve 41 with the internal surface bounding the interior 40, and especially the internal thread 3, from coming into contact with the hardenable material.

The above-discussed arrangement is fully discussed in our application Ser. No. 631,153 to which reference is being had for further details and modifications. It is to be understood that the expedients of the present invention which will be discussed presently can be employed in any of the embodiments disclosed in our above-identified application.

According to the present invention, a bag-shaped limiting member 7 surrounds at least a portion of the anchoring element 1, 6. As illustrated, the limiting member 7 surrounds the collar 6; however, it is to be understood that the trailing end portion of the limiting member 7 could be clamped between the collar 6 and the anchoring member 1, or that it could be mounted only on the anchoring member 1. When the hardenable material is forced by the injecting device 10 to flow through an internal passage 42 of the sleeve-shaped guiding element 41 and through the passage 22, it will gradually fill the compartment outwardly bounded by the limiting member 7 which is located within the cavity 5 of the support structure 14, until the limiting member 7 assumes a substantially balloon-shaped configuration. The limiting member 7 is preferably gas-permeable but impermeable to the hardneable material, whereby any air which may be entrapped in the compartment prior to the commencement of the injection of the hardenable material will be vented into the cavity 5 as it is being displaced by the hardenable material. This can be achieved, for instance, by providing a plurality of spaced openings 8 through the limiting member 7, such openings or perforations having such flow-through cross-sections as to permit flow of gaseous media therethrough but to prevent escape of the hardenable material therethrough from the compartment into the cavity surrounding the limiting member 7.

A resilient valve member 9, for instance, of rubber, surrounds the region of the anchoring member 1 in which the passage 22 is provided, such valve member being deflected from the region of the anchoring member 1 on which it is mounted by the pressure of the hardenable material which is being introduced into the compartment, to permit the flow of such hardenable material through the passage 22 and around the above-mentioned region into the compartment outwardly bounded by the limiting member 7. However, when the pressure within the compartment equals or exceeds that in the passage 22, such as upon the termination of the injection of the hardenable material, the valve member 9, due to its resiliency and, as the case may be, also due to the pressure differential between the compartment and passage 22, will sealingly contact the above-mentioned region and thus prevent flow of the hardenable material from the compartment into the passage and thus into the interior 40 of the anchoring member 1.

Figure 2:
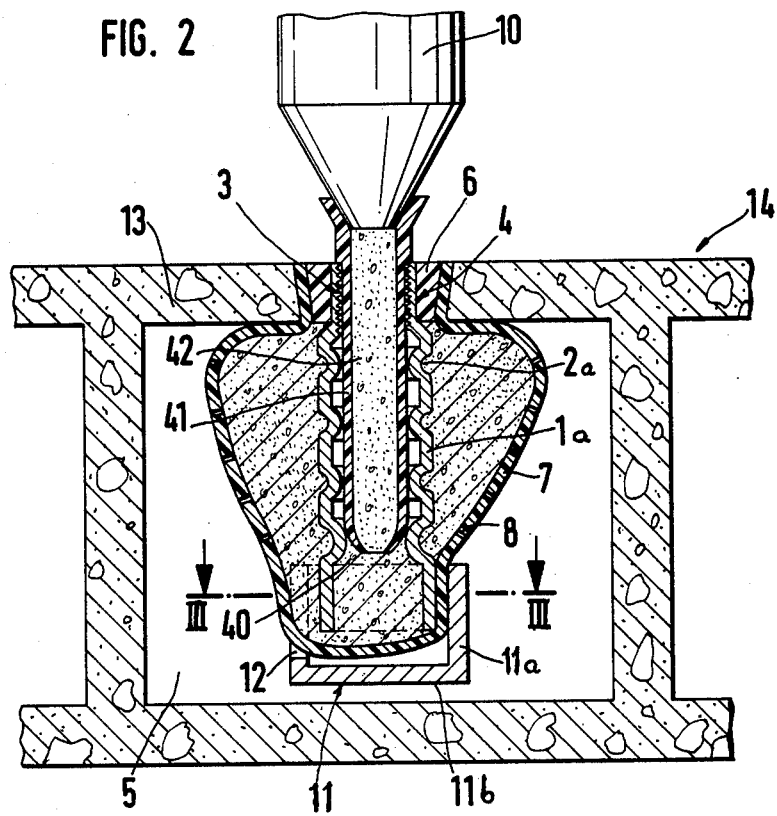
FIG. 2 is a view similar to FIG. 1 and showing a different embodiment of the present invention which utilizes a retaining member.
Figure 3:
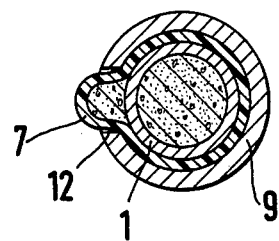
FIG. 3 is a cross-sectional view taken on line III—III of FIG. 2.

The hardenable material which is introduced into the compartment will harden therein, the hardening process being enhanced by the presence of the perforations 8 in the limiting member 7. Simultaneously therewith, also the hardenable material present in the internal passage 42 of the sleeve-shaped guiding member 41 will harden to form a core of hardened material therein which is subsequently removed from the interior 40 of the anchoring member 1 during the removal of the sleeve-shaped guiding member 41 therefrom. Upon such removal, the interior 40 of the anchoring member 1 will be empty, thus permitting the threading of a screw or a similar threaded member into the internal thread 3 of the anchoring member 1. The embodiment illustrated in FIGS. 2 and 3 is in many respects similar to that illustrated in FIG. 1 so that the same reference numerals have been used to designate similar parts. The anchoring member of this embodiment has been designated with the reference numeral 1a, and is provided with a plurality of depressions 2a which serve the same purpose as the undulations 2 of the embodiment of FIG. 1, that is, to increase the retention capability thereof in the body of hardened material.

The anchoring member 1a of FIG. 2 has an open leading end which corresponds in function to the above-mentioned passage 22 of FIG. 1, that is, to introduce the hardneable material into the compartment bounded by the limiting member 7. A cap-shaped retaining member 11 having a circumferential wall 11a and a bottom wall 11b is mounted on the leading end portion of the anchoring member 1a so as to sandwich a region of the bag-shaped limiting member 7 between itself and the leading end portion of the anchoring member 1a. Thus, the retaining member 11 connects the limiting member 7 to the anchoring element 1a, 6 at a location which is remote from the location at which the limiting member 7 is sandwiched between the collar 6 and the internal surface of the anchoring hole in the support structure 14. The connection of the limiting member 7 to the anchoring element 1a, 6 at this additional location not only improves the transmission of forces between the limiting member 7 and the anchoring element 1a, 6, but also constrains the limiting member 7 so that the latter is forced to assume a bulge-shaped configuration as it is being expanded during the introduction of the hardenable material into the compartment bounded thereby. The cap-shaped retaining member 11 is preferably pressure-fitted onto the region of the limiting member 7 which surrounds the leading end portion of the anchoring member 1a in such a manner that a space remains between the bottom wall 11b of the retaining member 11 and the leading end face of the anchoring member 1a.

The retaining member 11 of the present invention further has a slit 12 in the circumferential wall 11a thereof, the slit 12 extending axially of the circumferential wall 11a, being closed at the end thereof which is adjacent to the bottom wall 11b and open at its end which is remote from the bottom wall 11b. When the hardenable material is introduced into the compartment of the limiting member 7 through the open end of the anchoring member 1a, the pressure of the hardenable material will deflect the affected region of the limiting member 7 from the open end of the anchoring member 1a and into the slit 12 so as to form a path for the flow of the hardenable material from the interior 40 of the anchoring member 1a into the compartment bounded by the limiting member 7. Upon the termination of the injection of the hardenable material, the affected region of the limiting member 7 will reassume its original, non-deflected position due to its resiliency and/or the pressure differential between the compartment and the interior 40, thus eliminating the above-mentioned path and preventing the hardenable material from flowing from the compartment of the limiting member 7 into the interior 40 of the anchoring member 1a. Once the compartment of the limiting member 7 is filled with the hardenable substance, and the hardenable substance hardens therein about the anchoring member 1a, the latter will be securely retained in the body of hardened material by being embedded therein, whereby extraction of the anchoring element 1a, 6 from the anchoring hole of the support structure 14 by the forces resulting from attachment of objects to the anchoring member 1a will be prevented. The bulge-shaped configuration of the limiting member 7 and of the body of the hardenable material accommodated therein assures large-area contact with the wall 13 of the support structure 14.

The embodiment illustrated in FIG. 4 is in many respects similar to that illustrated in FIG. 1 so that again the same reference numerals have been used to designate similar parts. In this embodiment, the limiting member 7 is of a non-isotropic fabric or the like, so that the limiting member 7 is extendable only in the radial direction thereof. Such fabrics are already known and can be made, for instance, by making the radial fibers thereof loose while making the longitudinal fibers taut. Because of the stretchability of the limiting member 7 only in the radial direction thereof, there will be obtained a large-area contact between the limiting member 7 and the body of hardenable material contained therein, and the wall 13 of the support structure 14.

FIG. 4 also illustrates an additional aspect of the present invention which can be used in any of the embodiments of the present invention. As illustrated, the collar 6 has a groove 45 adjacent an exposed face 44 of the collar 6, in which groove 45 a marginal zone of the limiting member 7 is received. To improve retention of the marginal zone in the groove 45, a ring-shaped spring member 43 may be provided which urges the marginal zone of the limiting member 7 into the groove 45 and clamps such marginal zone between itself and the collar 6. Alternatively, a sleeve-shaped member of elastically yieldable material, such as rubber, may embrace such zone and press the same against the collar 6.

It will be understood that each of the elements described above, or two or more together, may find a useful application in other types of constructions differing from the types described above, especially those disclosed in our application Ser. No. 631,153.

While the invention has been illustrated and described as embodied in an anchoring arrangement for securing objects to support structures having internal cavities, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and described to be protected by Letters Patent is set forth in the appended claims:

1. An arrangement for securing an object to a support structure having an anchoring hole which communicates with a cavity within the support structure, comprising an elongated anchoring element having one part of transverse dimensions smaller than, and another part of transverse dimensions substantially corresponding to those of the anchoring hole so that said anchoring element is insertable into the anchoring hole through an open end thereof until a leading end portion of said one part extends into the cavity and said other part supports said anchoring element at the open end of the anchoring hole and closes the latter, said anchoring element having an interior bounded by an internal surface and extending between said leading and a trailing end portion of said anchoring element; and means for forming a plug about at least said leading end portion of said anchoring element to thereby attach the latter to the support structure and to prevent the extraction thereof from the anchoring hole, including a bag-shaped limiting member mounted on the inserted anchoring element so as to surround at least said leading end portion of the latter and define therewith a compartment for accommodating a body of hardenable material for hardening therein, and being impermeable to the hardenable material to prevent the latter from escaping from said compartment into the cavity, and gas-permeable to permit venting of excess air from said compartment into the cavity and an interaction of the air in the cavity with the hardenable material in said compartment during the hardening thereof, and means for introducing the hardenable material into said compartment for hardening therein about said anchoring element, including at least one passage through said leading end portion for communicating said interior of said anchoring element with said compartment, and shielding means situated in said interior of said anchoring element at least during the introduction of the hardenable material into said compartment and operative for guiding the hardenable material through said interior toward said passage and for preventing the hardenable material from contacting said internal surface of said anchoring element at said trailing end portion thereof.

2. An arrangement as defined in claim 1, wherein said anchoring element includes a tubular anchoring member constituting said one part, and a mounting collar which constitutes said other part and is mounted on the trailing end portion of said anchoring member so as to surround the same.

3. An arrangement as defined in claim 1, wherein said anchoring element has an internal thread in said interior at said trailing end portion thereof for threading of a threaded attaching member thereinto.

4. An arrangement as defined in claim 1, wherein said limiting member is of an elastically yieldable material.

5. An arrangement as defined in claim 4, wherein said elastically yieldable material is a non-isotropic fabric which is yieldable only in the radial direction of said limiting member.

6. An arrangement as defined in claim 1, wherein said limiting member is permeable to gaseous media and impermeable to the hardenable material to permit venting of air from said compartment into the cavity and prevent escape of the hardenable material.

7. An arrangement as defined in claim 1, wherein said limiting member has a plurality of venting openings which permit flow of air, between said compartment and the cavity and prevent such flow of the hardenable material.

8. An arrangement as defined in claim 1, and further comprising means for preventing backflow of the hardenable material through said passage.

9. An arrangement as defined in claim 8, wherein said preventing means includes a resiliently yieldable valve member which extends across said passage and is deflected therefrom to permit introduction of the hardenable material into said compartment to resiliently return into the original position thereof for preventing backflow of the hardenable material into said interior.

10. An arrangement as defined in claim 9, wherein said valve member is sleeve-shaped and circumferentially surrounds a region of said leading end portion of said anchoring element in which said passage is provided.

11. An arrangement as defined in claim 1, and further comprising means for attaching said limiting member to said anchoring element, including biasing means urging a marginal zone of said limiting member against said anchoring element at a trailing end of the former.

12. An arrangement as defined in claim 11, and further comprising an external annular groove in said anchoring element adapted to receive said marginal zone.

13. An arrangement as defined in claim 11, wherein said biasing means includes a ring-shaped spring element surrounding said marginal zone.

14. An arrangement as defined in claim 11, wherein said biasing means includes a sleeve-shaped element surrounding said marginal zone.

15. An arrangement as defined in claim 11, wherein said marginal zone is juxtaposed with said other part of said anchoring element.

16. An arrangement for securing an object to a support structure having an anchoring hole which communicates with a cavity within the support structure, comprising an elongated anchoring element having one part of transverse dimensions smaller than, and another part of transverse dimensions substantially corresponding to those of the anchoring hole so that said anchoring element is insertable into the anchoring hole through an open end thereof until a leading end portion of said one part extends into the cavity and said other part supports said anchoring element at the open end of the anchoring hole and closes the latter, said anchoring element having an interior bounded by an internal surface and extending between said leading and a trailing end portion of said anchoring element; means for forming a plug about at least said leading end portion of said anchoring element to thereby attach the latter to the support structure and to prevent the extraction thereof from the anchoring hole, including a bag-shaped limiting member mounted on the inserted anchoring element so as to surround at least said leading end portion of the latter and define a compartment therewith, and means for introducing hardenable material into said compartment for hardening therein about said anchoring element, including at least one passage through said leading end portion for communicating said interior of said anchoring element with said compartment, and shielding means situated in said interior of said anchoring element at least during the introduction of the hardenable material into said compartment and operative for guiding the hardenable material through said interior toward said passage and for preventing the hardenable material from contacting said internal surface of said anchoring element at said trailing end portion thereof; and a retaining member so mounted on said leading end portion of said anchoring element that a zone of said limiting member is sandwiched between the same and said leading end portion.

17. An arrangement as defined in claim 16, wherein said retaining member is of a cup-shaped configuration and has a circumferential wall and a bottom wall; and wherein said circumferential wall has at least one axially extending slit open at one end which is remote from, and closed at the other end which is close to, said bottom wall.

* * * * *